Jan. 10, 1933.  H. J. SHAW  1,894,129
CONCRETE DELIVERY
Filed May 14, 1928   3 Sheets-Sheet 1
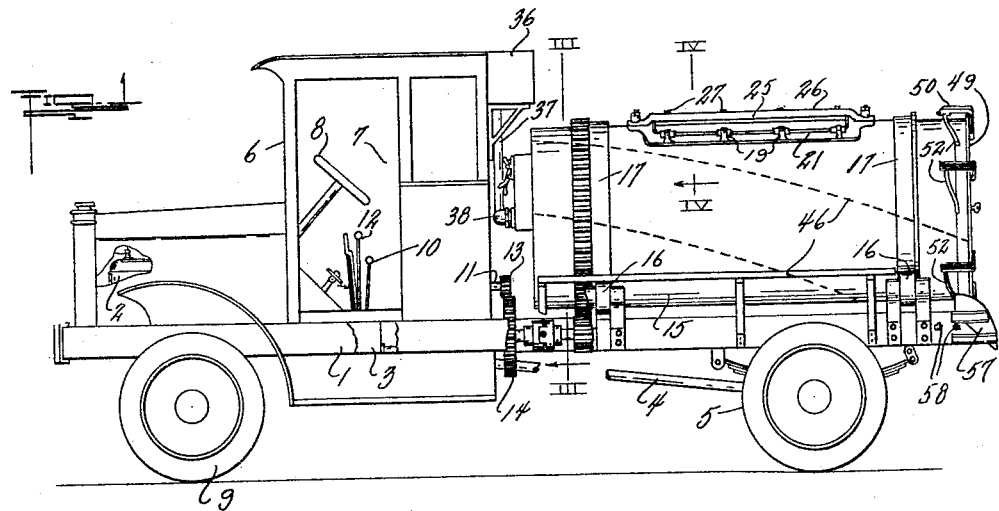
Harry J. Shaw
Inventor
By
Attorney

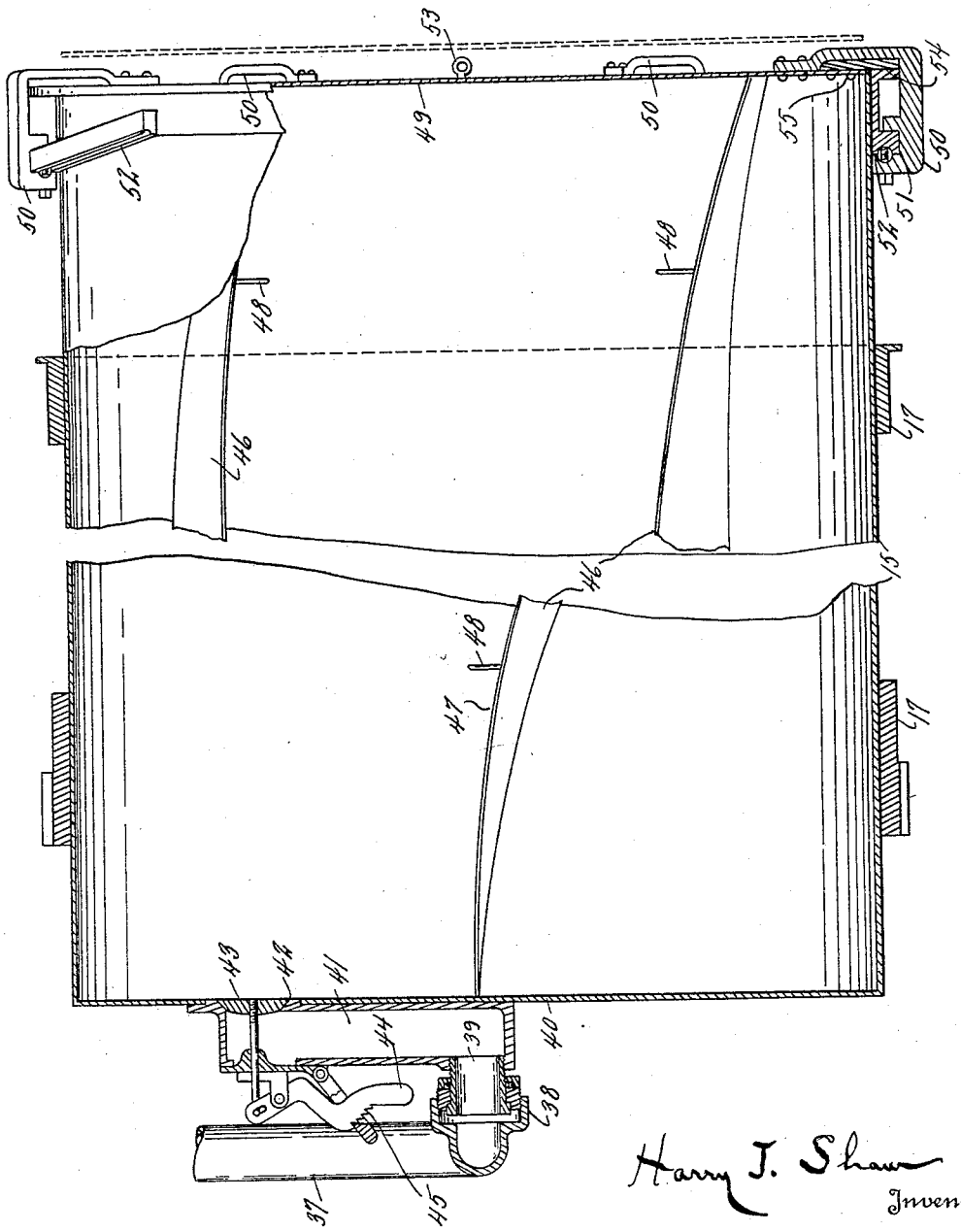

Jan. 10, 1933.  H. J. SHAW  1,894,129
CONCRETE DELIVERY
Filed May 14, 1928  3 Sheets-Sheet 3
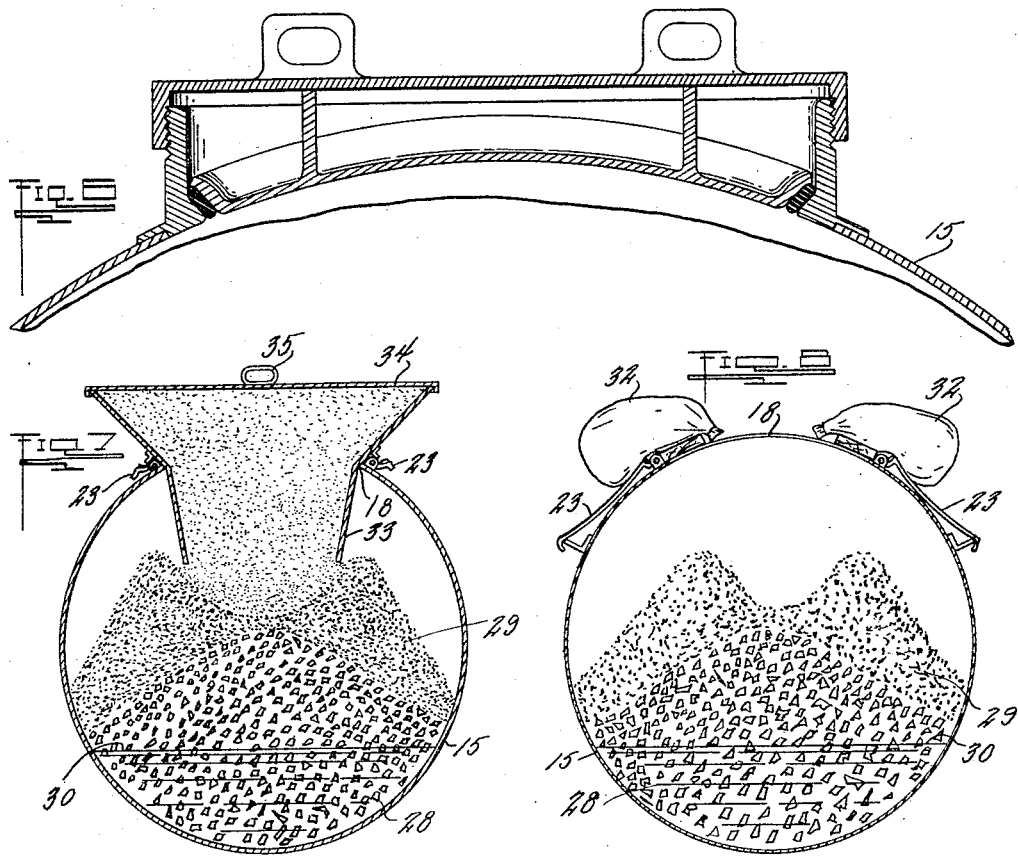
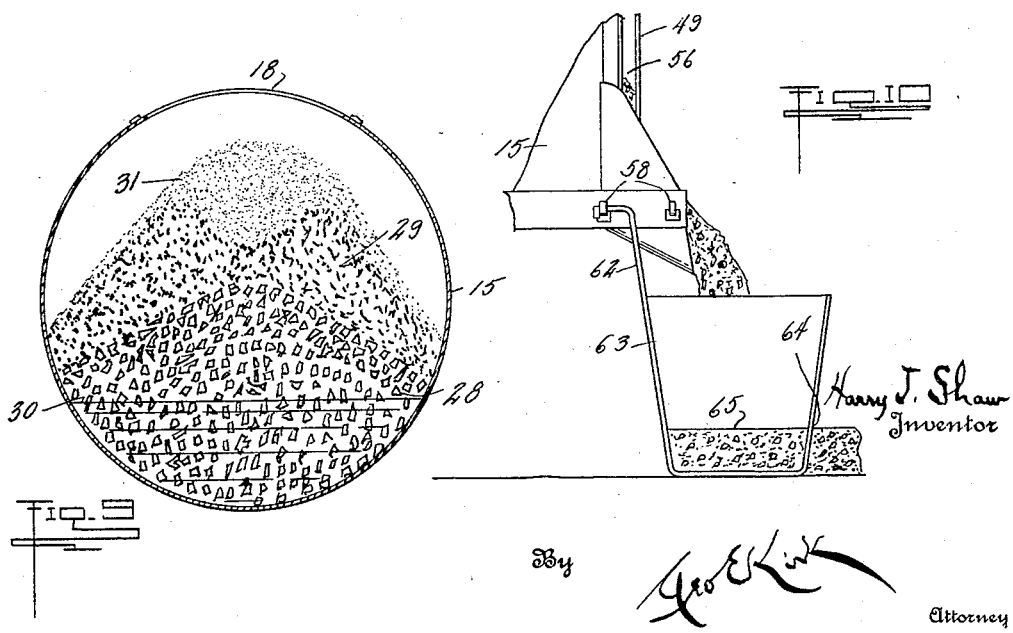
Harry J. Shaw
Inventor
By [signature]
Attorney Patented Jan. 10, 1933

1,894,129

UNITED STATES PATENT OFFICE

HARRY J. SHAW, OF TOLEDO, OHIO

CONCRETE DELIVERY

Application filed May 14, 1928. Serial No. 277,406.

This invention relates to conveying definite relative quantity of different materials to a remote location, commingling the material for uniform mixture and discharging.

This invention has utility when incorporated in concrete construction work for highways, roads, trenches, buildings, etc., wherein a truck with a mixer conveys the material and discharges such as the material at the job.

Referring to the drawings:

Fig. 1 is a side elevation, with parts broken away, showing an embodiment of the invention in an internal combustion engine propelled motor truck;

Fig. 2 is a rear view, with parts broken away, of the truck of Fig. 1 showing an attachable side delivery trough therefor at discharge;

Fig. 3 is a section on the line III—III, Fig. 1;

Fig. 4 is a section on an enlarged scale on the line IV—IV, Fig. 1;

Fig. 5 is a side view, parts being broken away, and largely in section, showing the device of Fig. 1;

Fig. 6 is a detail view in section of a screw type of side door for the shell of the structure;

Fig. 7 is a transverse section showing the repose relation of the material before the mixture occurs, when there is a partial receptacle or bottomless bin for the cement;

Fig. 8 is a view similar to Fig. 7 with the cement in the sacks ready for dumping upon the void providing materials at the job;

Fig. 9 shows the cement as dumped from the position in Fig. 8 or in a position which it may be carried to the job; and Fig. 10 is a fragmentary view showing a rear or follower spreader instead of a side discharging trough of Fig. 2.

Chassis 1 is shown as having internal combustion motor 2 operating transmission 3 having propeller shaft 4 extending to drive rear propulsion wheels 5. This chassis is shown as equipped with cab 6 at operator's station 7 in proximity to steering wheel 8 which may be controlled for directing forward pair of wheels 9 in steering the vehicle.

In proximity to the driver's station 7 in the cab 6 is control lever 10 for determining connection to power take off 11, the speed of which may be determined by gear shift lever 12 as operated from the internal combustion motor. This power take-off is effective through pinion 13 in mesh with gear 14 to rotate shell 15 mounted on rollers 16 carried by the chassis 1. These rollers 16 travel on tracks 17 of the shell 15. This shell 15 is herein shown as extending longitudinally of chassis 1 and disposed in proximity to the pair of propulsion rear wheels 5 and extending toward the pair of forward directing wheels 9.

This shell 15 is shown as provided at its side with opening 18 having in proximity thereto ears 19 through which bearing pin 20 as a fixed pin may extend on one side, and pin 21 may extend on the other side in initial assembly of closures 23 at the opening 18 into compressing position as to gaskets 24. Additionally, these closures 23 are shown as carrying free side ribs 25 across which may extend bridge providing bar 26 with set screw 27 therein operable against the ribs 25 for supplemental clamping action of the closures as engaged by the pins 20, 22.

In the operation of this transporting and mixing device as adapted for concrete work, this truck may be brought to the supply bins and at such location have dumped thereinto a charge 28 of major-void-providing material, as crushed stone, in the desired or measured quantity. Additionally, there may be dumped thereinto minor-void-providing material, as sand 29 in any desired or predetermined ratio as to the crushed stone. Inasmuch as neither of these materials is susceptible to water attack, the pre-mixing thereof may be had or the order of the dump may not be essential. However, it is preferred to have the coarser material provide a bridge or major void region over which the minor void material may be heaped.

With this mode of supply and the materials 28, 29, not responsive to moisture attack, the tank 30 of water may be carried in the shell 15 and provide a full or fractional amount of water needed for the mixing.

This water level is below that region which would expose the moisture beyond the heaped material so that in the heaping of the materials 28, 29, there may be holding of cement 31 away from the moisture. Deflecting the sand 29 sideways may leave a void material providing pocket for this cement 31 as shown in Figs. 7, 8, 9.

In the instance where the sand is heaped by lateral discharge to provide the pockets transversely, there may be supplemental pocket coacting by directing the coarser material or stone longitudinally away from the charging opening 18. In the event these precautions be not taken, sacks 32 may serve as holding means for the cement by depositing such along the upper portions of the shell 15 for transporting to the place of mixing. This will conveniently serve as means for inspection checking cement quantity. However, in practice, the cement either in a pocket of the voids or in a mechanical pocket as chute 33 (Fig. 7) may be adopted advantageously.

This chute 33 as projecting through the opening 18 may have the charge of cement 31 therein supported by the void providing materials therebelow. In the event of inclement weather, closure 34 may be provided for this removable chute 33. Upon reaching the job, handles 35 on the chute 33 may be used for removing this chute 33. Thereafter, the closure 23 may be assembled.

In the event the water charge 30 as carried in the shell 15 be insufficient or in the event no water charge be used, tank 36 carried by the cab 6 may be adopted. Herein there is shown from an end 56 of this tank 36, water line 37 extending downwardly and then centrally to axial gland swivel connection 38 with axial opening 39 axially with closed end 40 at the forward portion of the shell 15. From this axial port 39 there is shown radial duct 41 to outlet port having valve seat 42 in proximity to the side of the shell 15 carrying the closure 23 (Fig. 5).

At this valve seat 42 is closure 43 operable by lever 44 which may be controlled by ratchet 45. These are in such position, that the operator in the cab 6 from operator's station 7 may determine the full opening or degree of the opening desired. The drop portion of the pipe 37 is sufficiently to one side to clear the valve lever and ratchet in their rotation with the shell. In this operation, the flow of water at all times flushes the seat 42 so that material may not accumulate thereon. Normally this discharge occurs with the shell 15 at rest and the closure 23 upward thus permitting discharge of water above the level of the charge of crushed stone, sand and cement.

The shell 15 has therein pitch providing vanes 46 herein shown providing troughs 47. Transversely of these troughs 47 are foraminous baffles 48. The dry material or material as moistened below that for the concrete mix has a high angle of repose. As the mixture gets to the uniformity desired for discharge, its flow angle is reduced. Accordingly hereunder, in the operation of the shell 15, the higher-angle-repose lower-flow-rate material is retarded by the baffles 48 and dumped into the transverse region for maintained mixing until its fluidity is sufficient to readily pass the baffles 48. In this maintenance of charge for disposition longitudinally of the shell 15 during the mixing operation, such mixing may be automatically uniformly effected, and as the mixing is being completed there is the automatic accumulation to a damming extent at the vicinity of head 49 at the rear of shell 15 and opposing the closed head 40 at the forward end. If discharge is not then had, the material will back-fall in re-working.

This head 49 is provided with overhanging brackets 50 (Figs. 1, 2, 5) providing inwardly directed bearings 51 coacting with cam regions 52. These brackets 50 additionally carry lugs 53 in convenient location for bar engagement effective for angularly shifting this head 49 so that seat 54 of the head may be shifted away from seat 55 of the shell thus providing clearance region 56 so that as this head 49 rotates with this shell 15, the mixed material as directed by the vanes 46 may flow from the troughs 47 through this clear way and be received by primary chute 57. From this primary chute 57 there may be discharge as desired.

This primary chute 57 is shown as having at its sides hooks 58 which may be engaged by arms 59, 60, of inclined chute 61 in effecting lateral discharge of the material as to the vehicle. In the event rearward discharge in a uniformly distributed layer is desired, the hooks 58 may be engaged by brackets 62 carrying bottomless trough 63 having rear adjustable skimmer edge 64 so that there may be spread a uniform layer 65 of the mixed concrete from this device.

In practice hereunder, the supply station may charge the stone 28, sand 29 and incorporate the cement 31 in the desired relation. Water 30 in the shell 15 or in the tank 36 may simultaneously be supplied so that the mixer is charged with the desired proportions for the mixture specifications. Transportation may be had directly to the job. In the event the conditions are not ready for the immediate discharge of material, the truck may be located and take its turn. Under usual specifications, there is required but a mixing operation of two or three minutes. Such may be supervised and undertaken at the job, or as approaching the job. Preferably this occurs at the job for thereby a less strain on the power plant of the vehicle occurs.

With the mixing operation having been completed, the discharge may occur by the releasing of the rear head 49 for its spacing.

Rotation at once tends to spill out of the shell 15. As the charge has been delivered either by location in a pile or distributed as may be desired, the vehicle may be flushed, the closure head 49 reset, and the truck returned for a repetition of this cycle of operations.

What is claimed and it is desired to secure by United States Letters Patent is:

1. A self-dumping truck comprising a chassis, a shell mounted on the chassis, a head for the shell, said head having marginal mounting and locking means extending axially over the shell from said opening for spacing the head from the shell, a drive for rotating the shell to effect flow of material from the shell at the opening between the spaced head and the shell, and directing means from the shell for the discharging material.

2. A self-dumping truck comprising a chassis, a shell mounted on the chassis having a full diameter opening, a head for the opening, means for spacing the head from the shell, a drive for rotating the shell to effect flow of material from the shell at the opening between the spaced head and the shell, and attachable portable trough directing means from the shell for the discharging material.

3. A dumping truck comprising a chassis, a shell mounted on the chassis, means for rotating the shell as to the chassis, and a liquid supply axial connection to the shell provided with a radial duct therefrom terminating in a delivery opening into the shell.

4. A dumping truck comprising a chassis, a shell mounted on the chassis, means for rotating the shell as to the chassis, a liquid supply axial connection to the shell provided with a radial duct therefrom terminating in a delivery opening into the shell, and a closure provided with a self-flushing seat for the opening at the shell.

5. A dumping truck comprising a chassis, a shell mounted on the chassis providing a chamber, said shell having a liquid supply opening to said chamber, means for rotating the shell as to the chassis, a liquid supply connectible axially to the shell, and a closure provided with a self-flushing seat for the opening into the chamber.

6. A self-dumping truck comprising a chassis, a shell mounted on the chassis and having a rear discharge opening, a drive for rotating the shell, directing means in said shell for promoting discharge of material from the shell opening, a closure for the shell opening, and means entirely exterior of the shell coacting between the closure and shell for carrying the closure in open position during rotation of the shell.

7. The method of supplying cementitious material to work comprising dumping void-providing materials in a pile to a heaping extent to provide a pocket, sustaining in said pocket mixture-responsive void-filling union-effecting material, transporting the materials as thus assembled toward the region for use, supporting said materials on an axis above the lower portion of the materials, rotating the support to effect agitating said materials into a mixture, and by rotation on said same axis, effecting discharge of the mixture.

8. A vehicle chassis, two pair of carrying wheels therefor, a tubular shell mounted on the chassis in the region of one pair of wheels and extending toward the other and terminating in a discharge opening directed rearwardly, trough providing vanes in said shell having a pitch toward said discharge opening, rotation means for the shell upon an axis longitudinally of the chassis and the shell, and baffles in the vane troughs for impeding flow toward said opening.

In witness whereof I affix my signature.

HARRY J. SHAW.